United States Patent
Agrawal et al.

(10) Patent No.: US 9,832,368 B1
(45) Date of Patent: Nov. 28, 2017

(54) MANAGING UNINTENDED CAMERA CLICKS

(71) Applicant: Motorola Mobility LLC, Chicago, IL (US)

(72) Inventors: Amit Kumar Agrawal, Bangalore (IN); Mayank Gupta, Naperville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/169,389

(22) Filed: May 31, 2016

(51) Int. Cl.
*H04N 5/232* (2006.01)
*H04N 5/247* (2006.01)
*H04N 5/907* (2006.01)

(52) U.S. Cl.
CPC ..... *H04N 5/23216* (2013.01); *H04N 5/23219* (2013.01); *H04N 5/247* (2013.01); *H04N 5/907* (2013.01)

(58) Field of Classification Search
CPC .... H04N 5/23219; H04N 5/247; H04N 5/907; H04N 5/23293; H04N 5/2258; H04N 5/23216; H04N 5/232; H04N 5/23245; H04N 5/23258; G06F 3/017; G06F 3/012; G06F 1/1686; G06F 1/1694; H04M 2250/52; G06K 9/00221
See application file for complete search history.

(56) References Cited

U.S. PATENT DOCUMENTS

| | | | | |
|---|---|---|---|---|
| 8,106,856 B2* | 1/2012 | Matas | ................... | G06F 3/0485 |
| | | | | 345/156 |
| 9,491,427 B2* | 11/2016 | Lee | ................... | H04N 21/41407 |
| 9,628,699 B2* | 4/2017 | Cheng | ................ | H04N 5/23219 |
| 9,674,444 B2* | 6/2017 | Kim | ..................... | H04N 5/2258 |
| 2003/0117501 A1* | 6/2003 | Shirakawa | ........... | H04N 5/2251 |
| | | | | 348/218.1 |
| 2006/0044396 A1* | 3/2006 | Miyashita | ............ | H04N 5/2252 |
| | | | | 348/207.99 |
| 2011/0076003 A1* | 3/2011 | Cho | ....................... | G03B 17/20 |
| | | | | 396/297 |
| 2012/0147204 A1* | 6/2012 | Jeong | .................... | H04N 5/2258 |
| | | | | 348/211.11 |
| 2012/0268552 A1* | 10/2012 | Choi | ..................... | H04N 7/147 |
| | | | | 348/14.07 |
| 2012/0274808 A1* | 11/2012 | Chong | ................. | H04N 5/2258 |
| | | | | 348/234 |
| 2012/0281129 A1* | 11/2012 | Wang | ................. | H04N 5/23219 |
| | | | | 348/333.01 |
| 2014/0157210 A1* | 6/2014 | Katz | ...................... | G06F 3/017 |
| | | | | 715/863 |

(Continued)

Primary Examiner — Michael Osinski

(57) ABSTRACT

A camera invocation gesture to access a first camera on a mobile device is received by the mobile device. Responsive to receiving the camera invocation gesture, a second camera on the mobile device is utilized to ascertain a context associated with whether a user likely intends to take a picture. If the mobile device ascertains that the user likely intends to take a picture, the mobile device can be placed in an operational picture mode in which pictures can be or can continue to be taken and saved on the mobile device. If the mobile device ascertains, from the context associated with the second camera, that the user likely does not intend to take a picture, then any pictures that are or were taken can be saved and the user can be prompted as to whether they wish to delete the pictures.

13 Claims, 8 Drawing Sheets

(56) References Cited

U.S. PATENT DOCUMENTS

| | | | | |
|---|---|---|---|---|
| 2014/0178027 A1* | 6/2014 | Lee | ............. | H04N 21/41407 |
| | | | | 386/201 |
| 2014/0240543 A1* | 8/2014 | Kim | ............. | H04N 5/2258 |
| | | | | 348/231.99 |
| 2014/0354848 A1* | 12/2014 | Kim | ............. | H04N 5/23229 |
| | | | | 348/231.2 |
| 2015/0085184 A1* | 3/2015 | Vidal | ............. | H04N 5/2252 |
| | | | | 348/376 |
| 2015/0189178 A1* | 7/2015 | Lombardi | ............. | H04N 5/2258 |
| | | | | 348/207.99 |
| 2016/0100106 A1* | 4/2016 | Shi | ............. | H04N 5/23293 |
| | | | | 348/262 |
| 2016/0156838 A1* | 6/2016 | Cheng | ............. | H04N 5/23219 |
| | | | | 348/222.1 |
| 2017/0013179 A1* | 1/2017 | Kang | ............. | G06F 3/04883 |
| 2017/0064206 A1* | 3/2017 | Ku | ............. | H04M 1/0264 |

* cited by examiner

MANAGING UNINTENDED CAMERA CLICKS

BACKGROUND

Mobile devices, such as cellular phones, are typically equipped with one or more cameras. In some instances, device-mounted cameras can be activated or launched in a quick manner, such as by a physical gesture. This alleviates the user having to unlock the device, navigate to the camera functionality, activate the camera functionality, and begin to take pictures. This can be quite useful in situations where a user wishes to take a picture of an event that is unfolding quickly.

Yet, a mobile device may be prone to misidentifying such gestures, such as recognizing normal motion as a camera invocation gesture. When this happens, unintended camera clicks can occur which, in turn, can cause unintended pictures to be taken. This can be problematic for a number of reasons. First, in high definition phones captured images can be quite large, e.g. 5-7 MB. If twenty or thirty images are captured, such as in a burst mode, a great deal of memory can be consumed. Second, if the images are also automatically saved to a network location, i.e. a "cloud" location, the user must take time to search for and delete the unintended images on both the mobile device and in the network location. Third, because the camera is operating, battery resources are consumed thus unnecessarily taxing the mobile device's battery.

BRIEF DESCRIPTION OF THE DRAWINGS

Embodiments managing unintended camera clicks are described with reference to the following Figures. The same numbers may be used throughout to reference like features and components that are shown in the Figures.

DETAILED DESCRIPTION

Overview

Techniques for managing unintended camera clicks are described. In this document, the term "click" is used to characterize the action that results in a picture being taken by a camera. Traditionally, the click was a physical click in which a button on a camera was pressed down. So a click can involve any type of button, hard key such as a volume key, and the like. In modern devices, a click can be a soft click, such as a touch input received on a mobile device's touchscreen.

In at least some embodiments, a camera invocation gesture to access a first camera on a mobile device is received by the mobile device. Responsive to receiving the camera invocation gesture, a second camera on the mobile device is utilized to ascertain a context associated with whether a user likely intends to take a picture. If the mobile device ascertains that the user likely intends to take a picture, the mobile device can be placed in an operational picture mode in which pictures can be or can continue to be taken and saved on the mobile device. If the mobile device ascertains, from the context associated with the second camera, that the user likely does not intend to take a picture, then any pictures that are or were taken can be saved and the user can be prompted as to whether they wish to delete the pictures.

In at least some other embodiments, a camera invocation gesture to access a first camera on a mobile device is received by the mobile device. Responsive to receiving the camera invocation gesture, the first camera is accessed and one or more pictures are taken by the first camera. The camera invocation gesture is evaluated relative to a confidence spectrum having multiple confidence levels in order to ascertain a confidence level of the camera invocation gesture. For a defined confidence level, a second camera on the mobile device is utilized to ascertain a context associated with whether a user likely intended to take the picture or pictures. For the defined confidence level, if the context ascertained by the second camera indicates that the user likely intended to take the picture or pictures, the pictures can be designated as "intended" and saved on the mobile device. If, on the other hand, the context ascertained by the second camera indicates that the user likely did not intend to take a picture, any picture taken is designated as "unintended." The user is then prompted to save or delete the pictures that were designated as "unintended."

In the discussion that follows, an operating environment is described in which the inventive embodiments can be employed. Following this, various embodiments for managing unintended camera clicks are described.

Operating Environment

Figure 1:
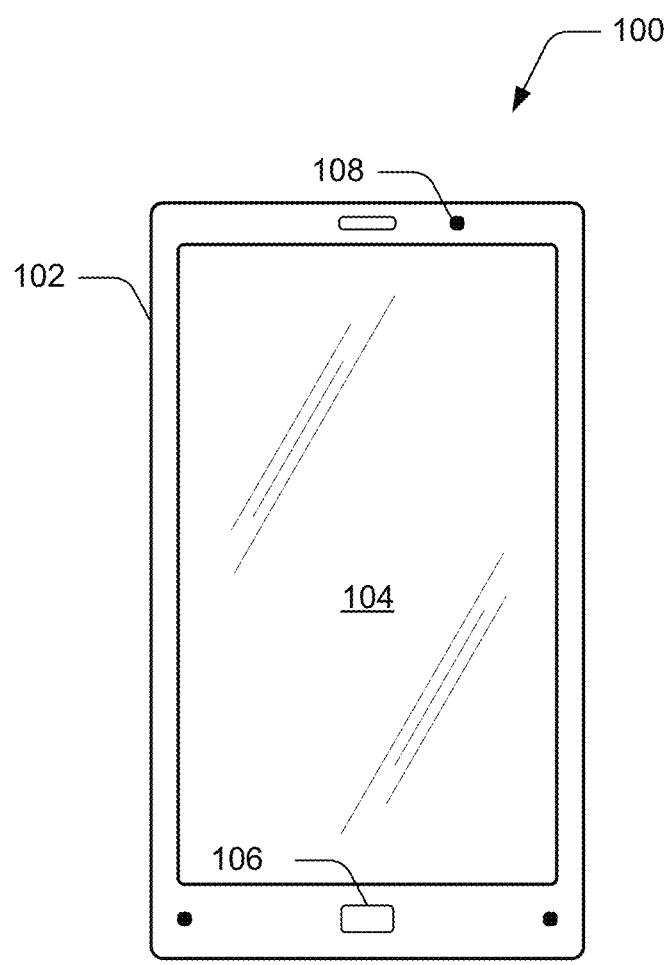
FIG. 1 illustrates an example system in which embodiments of managing unintended camera clicks can be implemented.

FIG. 1 illustrates a handheld, mobile device generally at 100, that can be used in connection with the inventive embodiments described herein. Typical mobile devices include cellular telephones, push-to-talk (PTT) devices, smart phones, PDAs, and others. The mobile device 100 includes a body or housing 102 that contains a display 104 that can display content such as phone numbers, text messages, internet information, images, the user and background, etc. The mobile device 100 also includes one or more switches 106 and multiple cameras, an example of which is shown at 108. The cameras can be disposed at any location on the front and back of the mobile device 100. Other input/output (I/O) devices such as microphones, wheels, joysticks, soft (software defined) or hard keys, touchscreens, speakers, antennas, and assorted I/O connections may be present in the mobile device but are not shown here.

Figure 2:
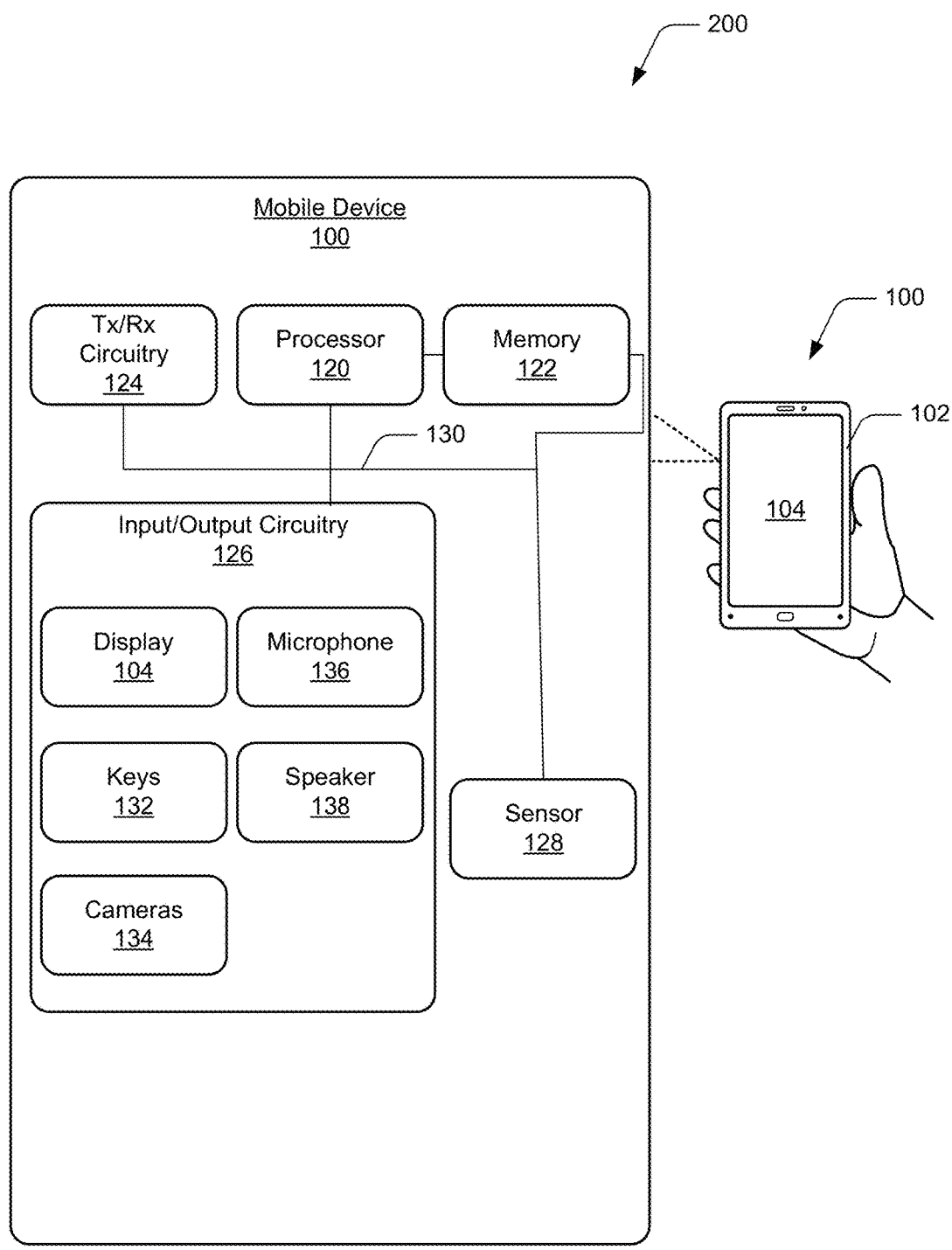
FIG. 2 illustrates an example mobile device in which embodiments of managing unintended camera clicks can be implemented.

The mobile device 100 also contains internal components and circuitry that control and process information and elements of the mobile device 100. For example, as shown generally at 200 in FIG. 2, the mobile device 100 contains a processor 120, a memory 122, transmit/receive circuitry 124, input/output circuitry 126, and a sensor 128 among other components that are not shown for clarity that are connected by a system bus 130 that operatively couples various components to the processor 120. The I/O circuitry 126 contains circuitry that is connected to the display 104, keys 132, cameras 134, microphone 136, speaker 138, etc. The sensor 128 may be an accelerometer and/or a gyroscope, for example. The accelerometer and gyroscope can be used to determine attitude and motion of the device which, in turn, can be processed to recognize gestures, as will become apparent below.

In some embodiments, the sensor 128 is formed from a conventional microelectromechanical systems (MEMS) device. In other embodiments, the sensor 128 and one or more of the cameras 134 may be the same element. Multiple gyroscopes and/or accelerometers or a combination thereof may be used to obtain more accurate sensor results. Further, the sensor 128 (as other elements) may provide different functionalities dependent on the device mode (e.g., game, camera, navigation device, internet browser, etc.).

The memory 122 may be a conventional memory that is commercially available. The memory 122 may include random-access memory (RAM), read-only memory (ROM), flash memory and the like, that contain, for example, non-transitory computer-accessible media. The processor 120 executes computer programs stored on the computer-accessible media.

Mobile devices can be communicatively connected to the Internet via a wired or wireless connection in a manner well known in the art. Wired connections can be provided using, for example, a modem or Ethernet or similar network card connected to a local-area network (LAN) or a wide-area network (WAN) that itself is connected to the Internet via, for example, a T1 line. Wireless connections can be provided using WiFi or some other connection. The mobile devices typically operate on an operating system stored on the device.

Having considered an example operating environment, consider now embodiments in which multiple cameras on a mobile device can be used to manage unintended camera clicks.

Managing Unintended Camera Clicks

In the discussion below, techniques for managing unintended camera clicks on a mobile device are described. A first of the techniques utilizes a first camera and a second camera on the mobile device to manage unintended camera clicks through a contextual analysis that is designed to ascertain whether a user likely intended to take a picture or not. A second of the techniques utilizes multiple cameras to manage unintended camera clicks, but also employs a confidence spectrum in addition to the contextual analysis to manage unintended camera clicks.

As noted above, many mobile devices that include cameras enable users to access the cameras through the use of camera invocation gestures. This relieves the users of having to unlock their mobile device, navigate to the camera functionality, activate the camera functionality, and begin taking pictures. Camera invocation gestures can include a wide variety of gestures including, by way of example and not limitation, touch gestures such as taps and swipes, and various motion gestures.

One specific camera invocation gesture, utilized by the assignee of this document, can involve holding the mobile device and twisting it two times, similar to the motion of turning a doorknob. By doing so, the camera can be automatically invoked and then, by touching anywhere on the device's display, a picture or pictures can be taken. This can enable a user to rapidly deploy the camera and begin taking pictures. Sometimes, however, input to a mobile device can be mistaken as a camera invocation gesture and can result in unintended pictures being taken. For example, consider the following scenario.

Ajay went for a walk and took his phone along. He has a habit of keeping a phone in his hand while he walks. While on his walk he saw a group of ducks gathered on the lake and took a photo of the ducks. He then continued on his walk and went back home after completing 30 minutes of the walk. Later, he decided to share the picture of the ducks he took on his walk with his friends. He opened his photo gallery to find the photo and expected it to be the last photo taken. However, much to his surprise, there were a number of other photos of pavement, grass, fingers, and more. He did not remember taking those photos and started selecting all the unintended photos to delete. Apparently, while he was on his walk, the motion of his hand holding his phone was mistakenly identified as a camera invocation gesture and, because his thumb was on the display of his device, unintended photos were taken. After spending more than 10 minutes of selecting the unintended photos, one-by-one, he deleted them from his phone. He finally found the photo he was looking for and was able to share it with his friends. Later that day, he received a message from his cloud photo storage provider that his account was running out of storage. Subsequently, he logged into his cloud account to find all of the unintended photos had been synced to his cloud account as well. He again had to spend a considerable amount of time to delete the unintended photos from the cloud.

Consider now how situations like this and others can be mitigated by using multiple cameras to manage unintended camera clicks.

Using Multiple Cameras to Manage Unintended Camera Clicks

Figure 3:
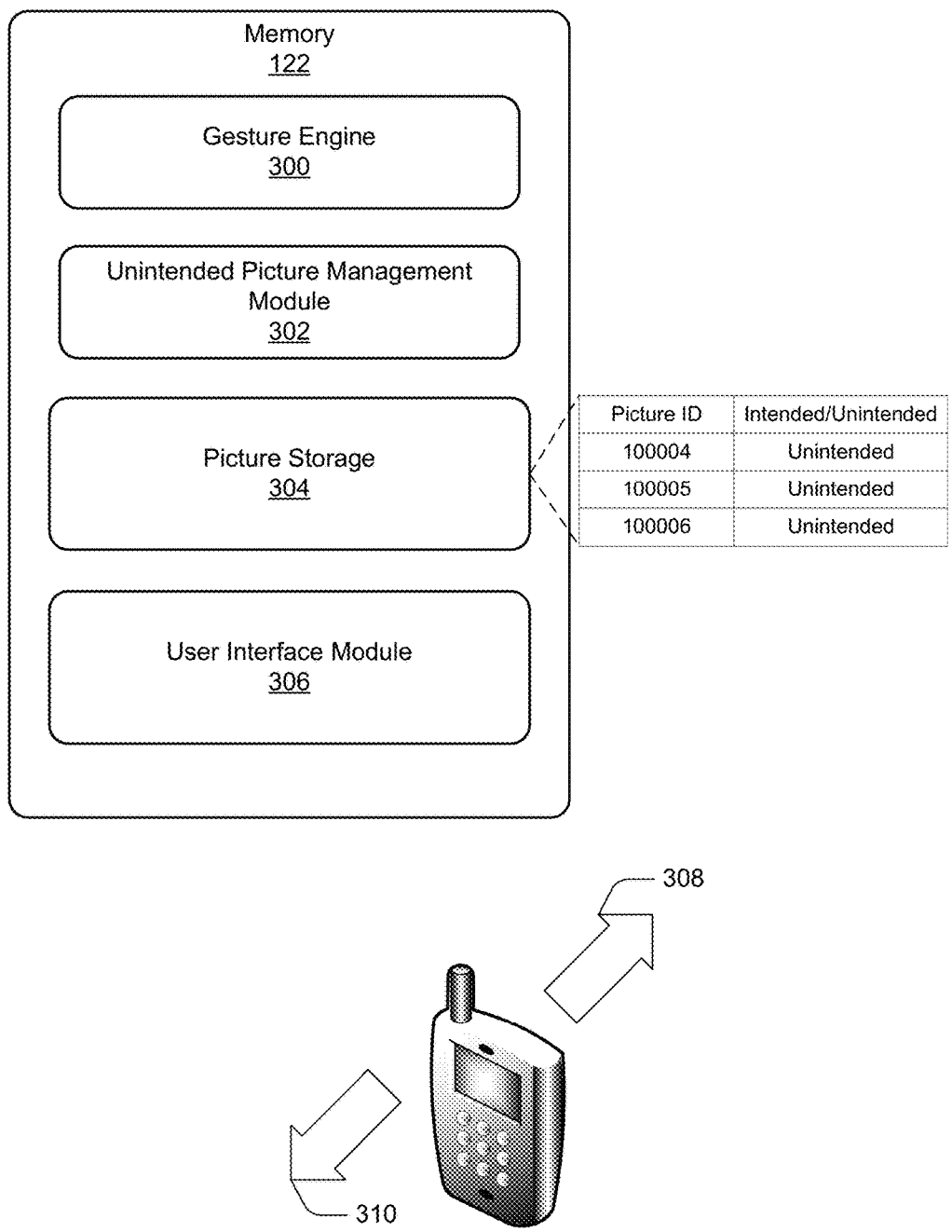
FIG. 3 illustrates example components that can be used to implement managing unintended camera clicks in accordance with one or more embodiments.

FIG. 3 illustrates example components that can be utilized to manage unintended camera clicks in accordance with one or more embodiments. In this particular example, memory 122 (FIG. 2) includes a gesture engine 300, an unintended picture management module 302, picture storage 304, and a user interface module 306.

Gesture engine 300 is representative of functionality that is used to receive input and process the input to identify a gesture. Any suitable type of gestures can be processed by gesture engine 300 including, by way of example and not limitation, taps, swipes, motion gestures and the like. Motion gestures can be identified through the use of one or more sensors, such as sensor 128 (FIG. 2) which can include an accelerometer and/or a gyroscope.

Unintended picture management module 302 is representative of functionality that is used to ascertain whether a user likely intends to take a picture. In at least some embodiments, when a gesture is received, gesture engine 300 determines whether the gesture is a camera invocation gesture to access a first camera on a mobile device. If the gesture is identified as a camera invocation gesture, the first camera (as indicated by arrow 308 representing the direction of a rear-facing camera) can be invoked and the unintended picture management module 302 can cause a second camera on the mobile device to be invoked (as indicated by arrow 310 representing the direction of a front-facing camera). In this example, the front-facing camera is utilized to ascertain a context associated with whether a user likely intends to take a picture. Any suitable type of context can be utilized. For example, the front-facing camera can take an image or video and the unintended picture management module 302 can process the image to ascertain whether a head appears in the image or video. That is, typically when a user takes a picture, the user will look through the viewfinder displayed on their display screen to see in the direction of arrow 308. If the unintended picture management module 302 ascertains that a head appears in the image or video captured by the front-facing camera, an inference can be made that the user likely intends to take a picture. Other contexts can be utilized as well. For example, in the image or video captured by the front-facing camera, the unintended picture management module 302 can analyze the image or video to ascertain the current position of the user's eyes. That is, typically when the user takes a picture, the user will look through the viewfinder displayed on their display screen. This means that the user's eyes will be looking directly or near directly at the device's display. If this is the case, an inference can be made that the user likely intends to take a picture. If, on the other hand, the user's eyes are not looking directly or near directly at the device's display, then an inference can be made that the user likely does not intend to take a picture.

If the mobile device ascertains that the user likely intends to take a picture, the mobile device can be placed in or remain in an operational picture mode in which pictures can be or can continue to be taken and saved in picture storage 304 on the mobile device.

If the mobile device ascertains, from the context associated with the second camera, that the user likely does not intend to take a picture, then any pictures that are taken can be saved in picture storage 304 and the user can be prompted, by way of user interface module 306, as to whether they wish to delete the pictures. In at least some embodiments, when the pictures are saved, the pictures can be categorized as either "intended" or "unintended", as represented by the table adjacent picture storage 304. In this particular example, the table has two columns, one designated "Picture ID" and "Intended/Unintended."

Some gestures may invoke the front-facing camera directly. In this case, if a gesture is received to invoke the front-facing camera, the techniques described herein can be used to ascertain whether the user likely intends to take a picture with the front facing camera. In yet other situations, if a user is taking a group "selfie" picture, using the techniques described herein to detect a face, head or eyes of an individual other than the user can still evidence a user's intent to take a picture.

Example method 400 is described with reference to FIG. 4. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
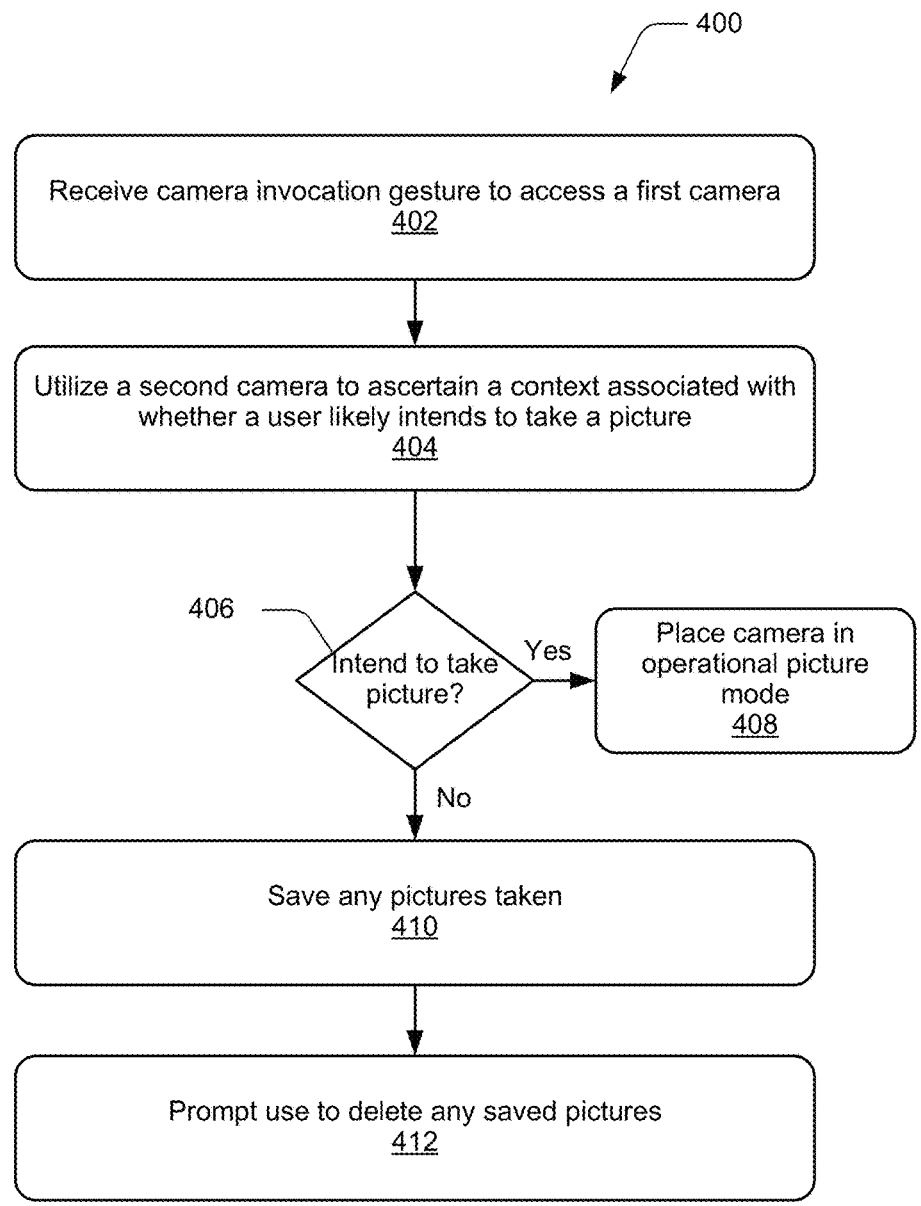
FIG. 4 is a flow diagram that describes operations in a method in accordance with one or more embodiments.

FIG. 4 illustrates example method(s) 400 of managing unintended camera clicks as described herein. The order in which the method is described is not intended to be construed as a limitation, and any number or combination of the described method operations can be performed in any order to perform a method, or an alternate method.

At 402, a camera invocation gesture to access a first camera on a mobile device is received by the mobile device. In the illustrated and described example, the first camera is a rear-facing camera that faces away from the user. Responsive to receiving the camera invocation gesture, a second camera on the mobile device is utilized, at 404, to ascertain a context associated with whether a user likely intends to take a picture. If the mobile device ascertains that the user likely intends to take a picture at 406, the mobile device can be placed in an operational picture mode, at 408, in which pictures can be taken or can continue to be taken and saved on the mobile device. Any suitable context can be utilized to ascertain whether the user likely intends to take a picture. For example, if the second camera captures a picture of a head in its viewfinder, then it can be inferred that the user is taking a picture. Similarly, if the second camera captures a picture of the user's eyes looking at the viewfinder, then it can be inferred that the user is taking a picture. If the mobile device ascertains from the context associated with the second camera, at 406, that the user likely does not intend to take a picture, then any pictures that are taken can be saved on the camera, at 410, and the user can be prompted, at 412, as to whether they wish to delete any saved pictures.

In this manner, the mobile device automatically determines whether any of the pictures that are taken are possibly unintended. The mobile device can then prompt the user to delete the pictures, thus saving the user time and effort to search through a storage album and find the unintended pictures that they wish to delete.

Having considered the above-described embodiment, consider now embodiments that utilize a multiple cameras and a confidence spectrum to manage unintended camera clicks.

Figure 5:
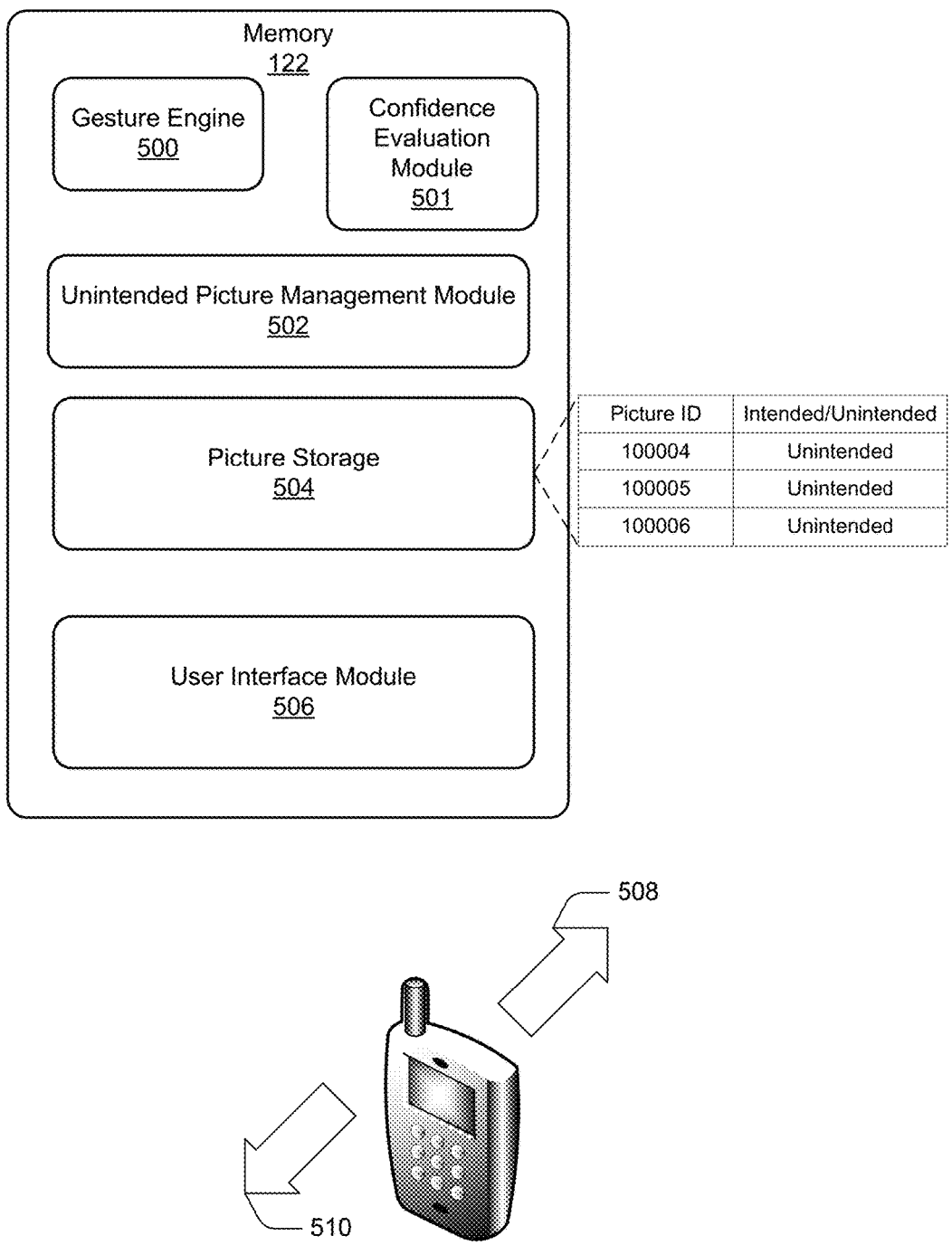
FIG. 5 illustrates example components that can be used to implement managing unintended camera clicks in accordance with one or more embodiments.

Using Multiple Cameras and a Confidence Spectrum to Manage Unintended Camera Clicks FIG. 5 illustrates example components that can be utilized to manage unintended camera clicks in accordance with one or more embodiments. In this particular example, memory 122 (FIG. 2) includes a gesture engine 500, a confidence evaluation module 501, an unintended picture management module 502, picture storage 504, and a user interface module 506.

Gesture engine 500 is representative of functionality that is used to receive input and process the input to identify a gesture, such as a camera invocation gesture. Any suitable type of gestures can be processed by gesture engine 500 including, by way of example and not limitation, taps, swipes, motion gestures and the like. Motion gestures can be identified through the use of one or more sensors, such as sensor 128 (FIG. 2) which can include an accelerometer and/or a gyroscope.

Confidence evaluation module 501 is representative of functionality that ascertains a confidence level associated with a gesture being a camera invocation gesture. Multiple confidence levels can be distributed along a confidence spectrum. For example, one end of the spectrum may have a low value while the other end of the spectrum has a high value with varying values in between. Thus, the confidence levels may vary from a low confidence level, up through moderate levels, and terminate at a high level. So, for example, if a gesture is received and corresponding data is processed by the confidence evaluation module 501 to assign a low confidence level of the gesture being a camera invocation gesture, the camera will not be invoked. If, on the other hand, the gesture is evaluated and assigned a high confidence level of the gesture being a camera invocation gesture, the camera will be invoked and will operate as usual. If the gesture is evaluated and assigned a moderate confidence level, the pictures taken during this time will be processed, as described below, using the unintended picture management module 502.

Unintended picture management module 502 is representative of functionality that is used to ascertain whether a user likely intends to take a picture. In at least some embodiments, when a gesture is received, gesture engine 500 processes the input to produce gesture data. The gesture data is used by the confidence evaluation module 501 to assign a confidence level to the gesture as to whether the gesture is a camera invocation gesture to invoke a first camera on a mobile device. One example of how this can be done is provided below in a section entitled "Assigning Confidence Levels". If the gesture is assigned a moderate confidence level as being a camera invocation gesture, the first camera (as indicated by arrow 508 representing the direction of a rear-facing camera) can be invoked and the unintended picture management module 502 can cause a second camera on the mobile device to be invoked (as indicated by arrow 510 representing the direction of a front-facing camera). In this example, the front-facing camera is utilized to ascertain a context associated with whether a user likely intends to take a picture. Any suitable type of context can be utilized. For example, the front-facing camera can take an image or video and the unintended picture management module 502 can process the image to ascertain whether a head appears in the image or video. That is, typically when a user takes a picture, the user will look through the viewfinder displayed on their display screen to see in the direction of arrow 508. If the unintended picture management module 502 ascertains that a head appears in the image or video captured by the front-facing camera, an inference can be made that the user likely intends to take a picture. Other contexts can be utilized as well. For example, in the image or video captured by the front-facing camera, the unintended picture management module 502 can analyze the image or video to ascertain the current position of the user's eyes. That is, typically when the user takes a picture, the user will look through the viewfinder displayed on their display screen. This means that the user's eyes will be looking directly or near directly at the device's display. If this is the case, an inference can be made that the user likely intends to take a picture. If, on the other hand, the user's eyes are not looking directly or near directly at the device's display, then an inference can be made that the user likely does not intend to take a picture.

If the mobile device ascertains that the user likely intends to take a picture, the mobile device can be placed in or remain in an operational picture mode in which pictures can be or can continue to be taken and saved in picture storage 504 on the mobile device.

If the mobile device ascertains, from the context associated with the second camera, that the user likely does not intend to take a picture, then any pictures that are taken can be saved in picture storage 504 and the user can be prompted, by way of user interface module 506, as to whether they wish to delete the pictures. In at least some embodiments, when the pictures are saved, the pictures can be categorized as either "intended" or "unintended", as represented by the table adjacent picture storage 504.

Consider now one example of how confidence levels can be assigned in accordance with one or more embodiments.

Assigning Confidence Levels

Figure 6:
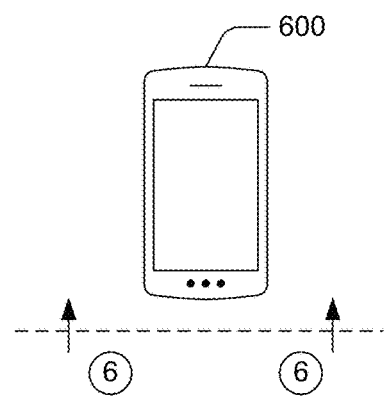
FIG. 6 illustrates an example of how confidence levels can be assigned in accordance with one or more embodiments.
Figure 6:
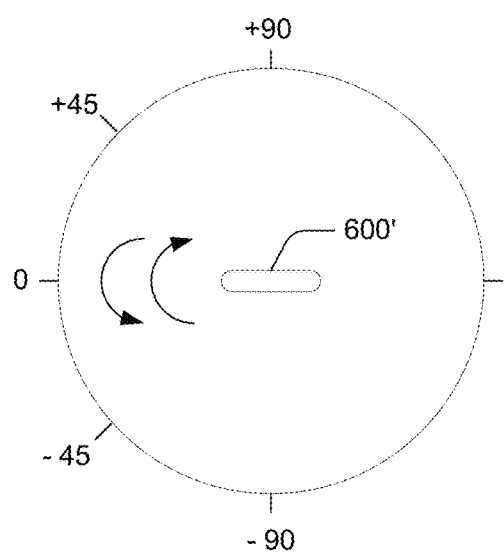

As noted above, camera invocation gestures can vary between mobile devices. In some instances, the camera invocation gesture may be a touch gesture such as a swipe or tap. In other instances, the camera invocation gesture may be a motion-based gesture. For example, one camera invocation gesture is the twist gesture mentioned above in which the mobile device is twisted twice in a manner similar to the motion used to turn a doorknob. If the mobile device is twisted twice through a high range of angles, then a high confidence level may be assigned. If, on the other hand, the mobile device is twisted twice through a low range of angles, then a low confidence level can be assigned. Similarly, if the mobile device is twisted through a moderate range of angles, a moderate confidence level may be assigned. As an example, consider FIG. 6.

There, a mobile device is shown generally at 600. The mobile device is also depicted 600', as viewed along line 6-6. The mobile device 600' appears within a circle that has a range of angles depicted including 0 degrees, +/−45 degrees, and +/−90 degrees. When the mobile device is twisted, sensors within the device, such as an accelerometer and gyroscope, can produce gesture data which can then be analyzed. Various threshold angles can be set and used to determine whether a gesture or motion is a camera invocation gesture. For example, if the mobile device 600' is rotated twice in the direction of the indicated arrows between −45 degrees and +45 degrees or greater, a high confidence level may be assigned that the gesture is a camera invocation gesture. If, on the other hand, the device is rotated between −35 degrees and +20 degrees, then a moderate confidence level may be assigned that the gesture is a camera invocation gesture. If the device is rotated between −20 degrees and +10 degrees, then a low confidence level may be assigned.

It is to be appreciated and understood, however, that this constitutes but one example of how confidence levels can be assigned to a particular gesture to ascertain whether the gesture is a camera invocation gesture. As such, confidence levels can be assigned in different ways and in connection with different gestures without departing from the spirit and scope of the claimed subject matter.

Example method 700 is described with reference to FIG. 7. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
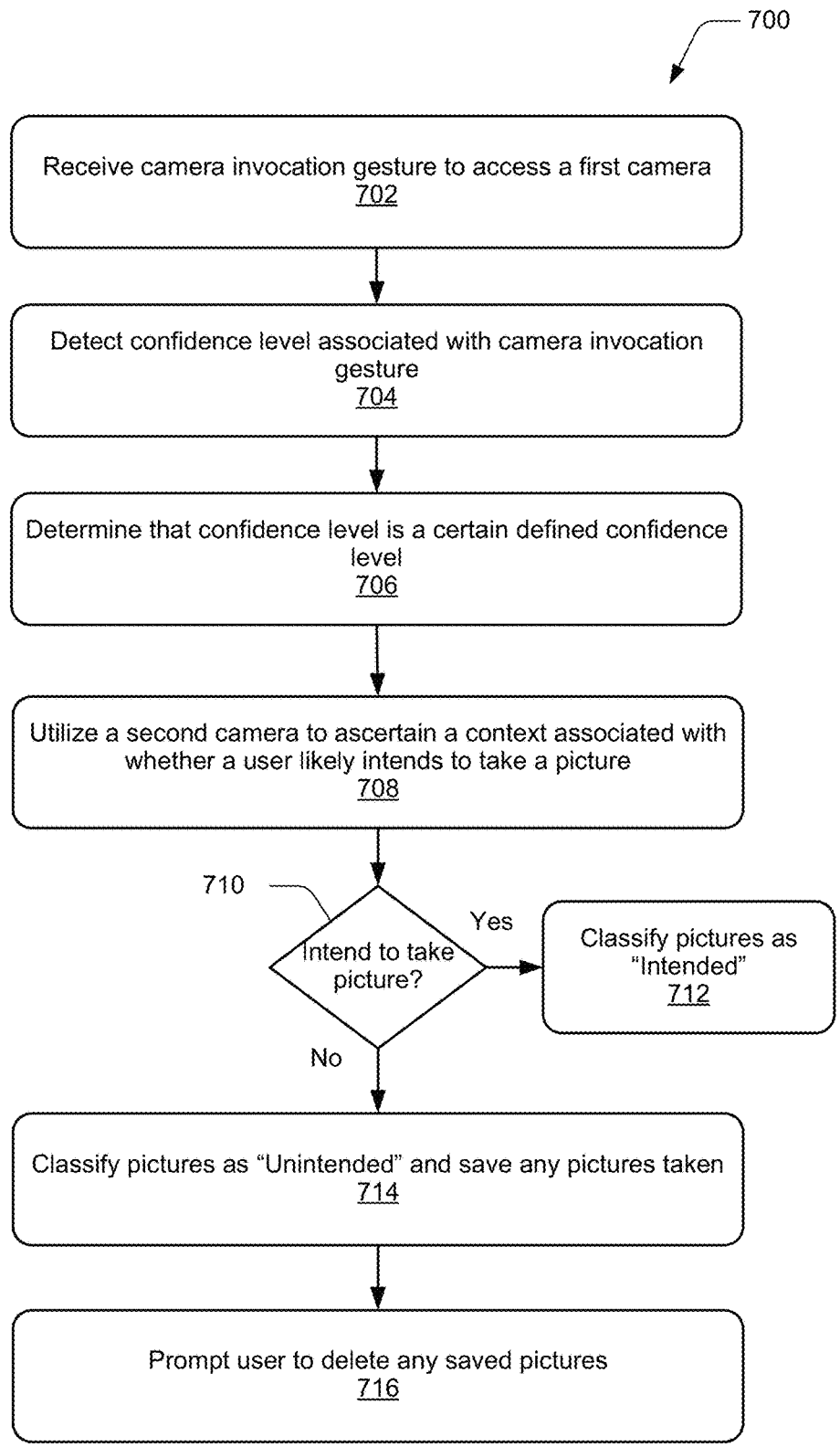
FIG. 7 is a flow diagram that describes operations in a method in accordance with one or more embodiments.

FIG. 7 illustrates example method(s) 700 of managing unintended camera clicks as described herein. The order in which the method is described is not intended to be construed as a limitation, and any number or combination of the described method operations can be performed in any order to perform a method, or an alternate method.

At 702, a camera invocation gesture to access a first camera on a mobile device is received by the mobile device. In the illustrated and described example, the first camera is a rear-facing camera that faces away from the user. In at least some embodiments, when the first camera is invoked, it can immediately begin taking pictures. At 704, a confidence level associated with the camera invocation gesture is detected. At 706 the confidence level is determined to be a certain defined confidence level. The certain defined confidence level is one in which it is uncertain whether the camera invocation gesture that invoked the camera was actually intended to invoke the camera. In the example above, the certain defined confidence level was a moderate confidence level that lay between a low confidence level and a high confidence level. Responsive to determining that the confidence level is the certain defined confidence level, a second camera on the mobile device is utilized, at 708, to ascertain a context associated with whether a user likely intends to take a picture. If the mobile device ascertains that the user likely intends to take a picture at 710, the pictures that are taken can be classified as "intended" and saved at 712. Any suitable context can be utilized to ascertain whether the user likely intends to take a picture. For example, if the second camera captures a picture of a head in its viewfinder, then it can be inferred that the user is taking a picture. Similarly, if the second camera captures a picture of the user's eyes looking at the viewfinder, then it can be inferred that the user is taking a picture. If, on the other hand, the mobile device ascertains, at 710, from the context associated with the second camera that the user likely does not intend to take a picture, then any pictures that are taken are classified as "unintended" and saved on the camera, at 714. The user can then be prompted, at 716, as to whether they wish to delete any saved pictures that were classified as "unintended".

In this manner, the mobile device automatically determines whether any of the pictures that are taken are possibly unintended. The mobile device can then prompt the user to delete the pictures, thus saving the user time and effort to search through a storage album and find the unintended pictures that they wish to delete.

Having considered various embodiments described above, consider now an example device that can be utilized to implement the described embodiments.

Example Device

Figure 8:
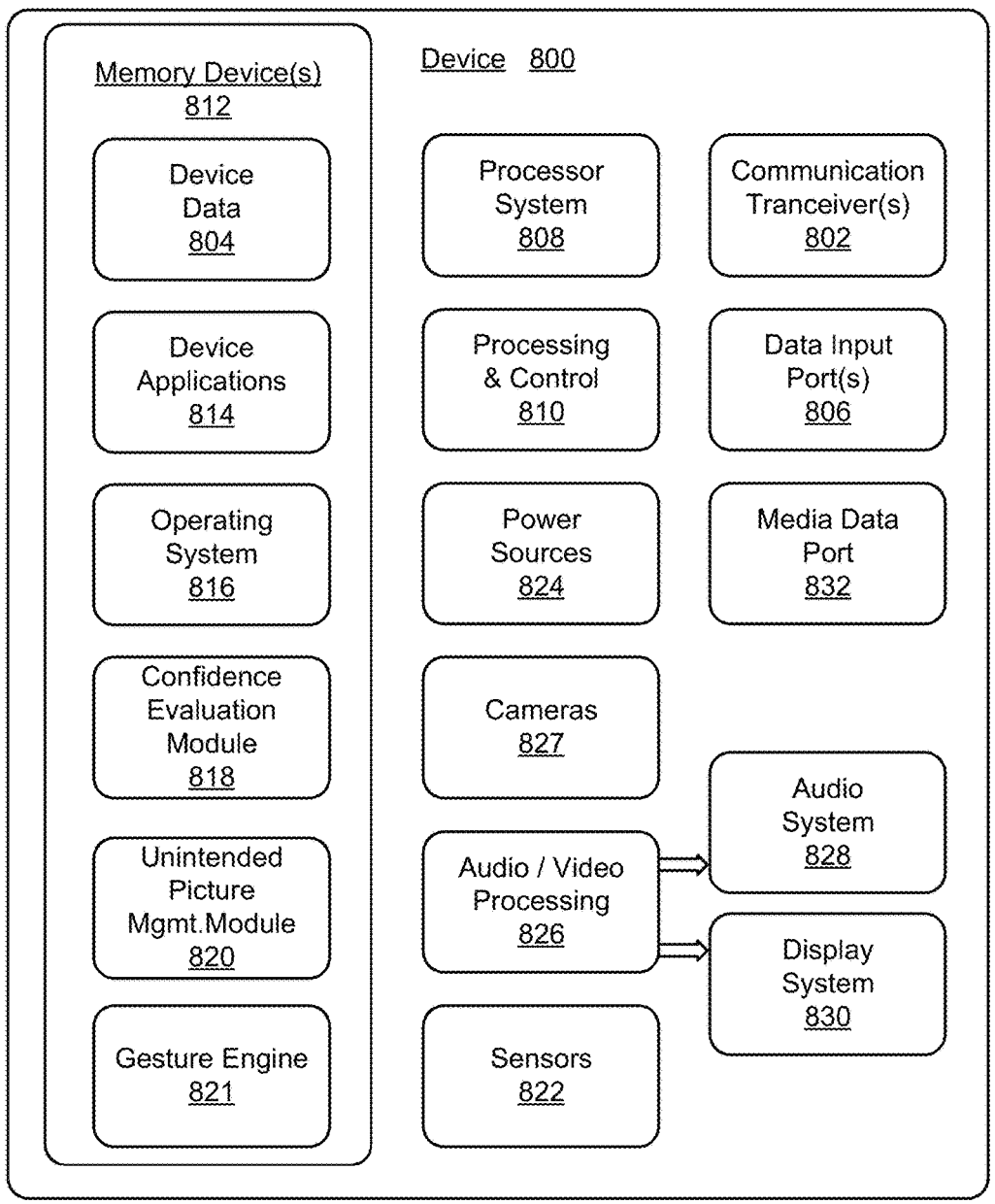
FIG. 8 illustrates various components of an example device that can implement embodiments of managing unintended camera clicks.

FIG. 8 illustrates various components of an example device 800 in which embodiments of managing unintended camera clicks can be implemented. The example device 800 can be implemented as any of the devices described with reference to the previous figures, such as any type of client device, mobile phone, tablet, computing, communication, entertainment, gaming, media playback, and/or other type of electronic device.

The device 800 includes communication transceivers 802 that enable wired and/or wireless communication of device data 804 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processing system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternately or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on. In this example, the device 800 includes a confidence evaluation module 818, unintended picture management module 820, and a gesture engine 821 that operates as described above.

The device 800 can also include one or more device sensors 822, such as any one or more of an ambient light sensor, a proximity sensor, a touch sensor, an infrared (IR) sensor, accelerometer, gyroscope, and the like. The device 800 can also include one or more power sources 824, such as when the device is implemented as a mobile device. The power sources may include a charging and/or power system, and can be implemented as a flexible strip battery, a rechargeable battery, a charged super-capacitor, and/or any other type of active or passive power source.

The device 800 also includes an audio and/or video processing system 826 that generates audio data for an audio system 828 and/or generates display data for a display system 830, and multiple cameras 827. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 832. In implementations, the audio system and/or the display system are integrated components of the example device. Alternatively, the audio system and/or the display system are external, peripheral components to the example device.

Although the embodiments described above have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method for a mobile device, comprising:
receiving a camera invocation gesture to access a first camera on a mobile device;
responsive to receiving the camera invocation gesture, utilizing a second camera on the mobile device to ascertain a context associated with whether a user intends to capture a picture using the first camera;
responsive to ascertaining that the user does not intend to capture a picture using the first camera based on the context ascertained by the second camera, saving any pictures that are captured by the first camera on the mobile device; and
prompting the user as to whether they wish to delete any of the saved pictures.

2. The method as recited in claim 1, wherein the first camera is a rear-facing camera.

3. The method as recited in claim 1, wherein the second camera is a front-facing camera.

4. The method as recited in claim 1, wherein the first camera is a rear-facing camera and the second camera is a front-facing camera.

5. The method as recited in claim 1, wherein the context comprises determining whether the second camera captures a picture of a head of the user.

6. The method as recited in claim 1, wherein the context comprises determining whether the second camera captures a picture of a user's eyes looking at a viewfinder of the first camera.

7. A mobile device comprising:
a first camera;
a second camera;
one or more processors;
one or more computer readable storage media;
computer readable instructions embodied on the one or more computer readable storage media and executable by the one or more processors to perform operations comprising:
receiving a camera invocation gesture to access a first camera on a mobile device;
responsive to receiving the camera invocation gesture, utilizing a second camera on the mobile device to ascertain a context associated with whether a user intends to capture a picture using the first camera;
responsive to ascertaining that the user does not intend to capture a picture using the first camera based on the context ascertained by the second camera, saving any pictures that are captured by the first camera on the mobile device; and
prompting the user as to whether they wish to delete any of the saved pictures.

8. The mobile device as recited in claim 7, wherein the first camera is a rear-facing camera.

9. The mobile device as recited in claim 7, wherein the second camera is a front-facing camera.

10. The mobile device as recited in claim 7, wherein the first camera is a rear-facing camera and the second camera is a front-facing camera.

11. The mobile device as recited in claim 7, wherein the context comprises determining whether the second camera captures a picture of a head of the user.

12. The mobile device as recited in claim 7, wherein the context comprises determining whether the second camera captures a picture of a user's eyes looking at a viewfinder of the first camera.

13. A method for a mobile device comprising:
receiving a camera invocation gesture to access a front-facing camera on a mobile device;
responsive to receiving the camera invocation gesture, utilizing the front-facing camera to ascertain a context associated with whether a user intends to capture a picture using the front-facing camera;
responsive to ascertaining that the user does not intend to capture a picture using the front-facing camera based on the context ascertained by the front-facing camera, saving any pictures that are captured by the front-facing camera on the mobile device; and
prompting the user as to whether they wish to delete any of the saved pictures.

* * * * *